United States Patent
Dietrich, Sr.

(10) Patent No.: US 6,422,323 B1
(45) Date of Patent: Jul. 23, 2002

(54) TILLAGE TOOTH FOR USE IN AN IMPLEMENT PROVIDING A SMOOTH FINISH

(75) Inventor: William J. Dietrich, Sr., Goodfield, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/917,667

(22) Filed: Jul. 30, 2001

Related U.S. Application Data

(62) Division of application No. 09/613,655, filed on Jul. 11, 2000, now Pat. No. 6,276,462.

(51) Int. Cl.[7] ............................................. A01B 39/20
(52) U.S. Cl. ...................... 172/724; 172/730; 172/770
(58) Field of Search ................................. 172/722, 730, 172/724, 770

(56) References Cited

U.S. PATENT DOCUMENTS 1,908,903 A * 5/1933 Kovar
4,538,689 A * 9/1985 Dietrich, Sr. ........... 172/724 X

* cited by examiner

*Primary Examiner*—Christopher J. Novosad

(57) ABSTRACT

A tillage tooth for use in an implement which performs shallow tillage with tillage discs followed by chisel plows with winged points performing primary tillage in strips of untilled soil left by the forward discs. The points include wings mounted to either side of a central tooth. The wings are constructed and arranged to provide a greater rise to lift soil adjacent their inner edges than is provided by the outer edges of the wings. This imparts a lifting and lateral rolling motion to tilled soil and enhances a smooth finish.

5 Claims, 7 Drawing Sheets

TILLAGE TOOTH FOR USE IN AN IMPLEMENT PROVIDING A SMOOTH FINISH

RELATED APPLICATIONS

This application is a division of U.S. application Ser. No. 09/613,655, filed Jul. 11, 2000, entitled "Combination Tillage Equipment for Providing a Smooth Finish" now U.S. Pat. No. 6,276,462.

FIELD OF THE INVENTION

The present invention relates to an agricultural tillage system. More particularly, it relates to a tillage system that is capable of working the soil at a shallow depth with discs, and also providing some deep ("primary") tillage at a second, deeper depth, and then leveling the field, all in a single pass, thereby conserving fuel and equipment operating time.

BACKGROUND OF THE INVENTION

Single-pass tillage implements providing both shallow and primary tillage in a single pass using discs and chisel points are disclosed in U.S. Pat. Nos. 4,245,706; 4,403,662; and 4,538,689. These machines, however, leave furrows and/or ridges in the soil after use. It has become desirable to leave the surface of the soil as level as possible after tilling in the Fall to reduce the amount of soil preparation necessary before planting the following Spring. U.S. Pat. No. 5,080,178 discloses a disc leveler for use with a tillage machine such as is disclosed in U.S. Pat. No. 4,403,662.

During the late 1970's, before the machine shown in U.S. Pat. No. 4,403,662 became available, primary tillage was accomplished principally with moldboard plows. The moldboard plow leaves large slabs and chunks of soil that tend to break down over the freeze and thaw cycles of Winter, but this tillage practice required substantial working of the soil in the Spring in order to level the field and prepare it for planting of the next crop. Moreover, moldboard plowing is not an effective remedy for soil erosion, and has a tendency to exacerbate erosion.

In recent years, farmers have been looking for ways to decrease soil and wind erosion. The use of a large disc assembly in front of a chisel plow on a parabolic shank accomplished these goals and also breaks up the hard plow pan (or "sole") that is created at the particular depth at which the plow is set to operate, caused by repeated tillage at the same depth over the years. The parabolic shank and winged point of recent improved plows have reduced soil erosion, but this practice also may create large chunks of soil, and it usually requires substantial spring soil-working to prepare an adequate seedbed for planting.

During the 1970's, the cutter chisel was widely used. It consisted of a chisel plow with a row of coulters to cut the residue ahead of two rows of staggered shanks on thirty-inch centers. These shanks had a four-inch twisted point attached to them to perform the primary tillage. The tip of the point was at approximately a 45° angle to the horizontal, sloping downwardly and forwardly from the shank. The worked soil followed the curvature of the "C"-shaped shank that was attached to the chisel plow and was twisted in order to provide a moldboard-type turning action. A "C"-shaped shank, of the type described, is shown in U.S. Pat. No. 4,403,662.

For early cutter chisel plows, there was a net lateral movement of soil. A machine with, for example, 11 shanks would be equipped with five right-hand and six left-hand twisted points. The result was that a wide groove and a large berm were left after a pass. The machine as shown in U.S. Pat. No. 4,403,662 was an improvement because it left a smaller groove and not as large a berm by using fore and aft sets of discs and an improved point.

In U.S. Pat. No. 4,538,689, there is disclosed a winged point mounted on a parabolic shank. That winged point, in the combination shown, creates a large, rough surface similar to the surface of the moldboard plow used during the late 1970's and early 1980's. The wings on these points are set at a soil lift angle of approximately 30°. This lift angle was conventional at the time, but it is an aggressive angle which causes the wings to lift the soil abruptly. In some soils, particularly more compacted soils, the combination of an aggressive lift angle on the wings of the point, together with a parabolic shank, which is designed to lift and heave soil, lifted larger soil chunks and threw them out of the paths of the chisel plow and away from cooperating discs, making it difficult to create a level soil surface after a pass of the machine.

During the 1980's, farmers desired less tillage to prepare for planting. The furrows left by the chisel shanks had to be filled with the berms that were created between each shank. In order to fill these furrows behind large parabolic shanks, smaller shanks were placed to run shallower and were placed midway between the large chisel shanks. This resulted in smaller grooves on reduced centers. With the development of the disc leveler shown in U.S. Pat. No. 5,080,178, the furrows behind the shanks were substantially filled without leaving substantial grooves after the shanks had passed, thus improving the levelness or "smoothness" of the surface.

In heavily compacted soils, a parabolic shank lifts out large chunks of soil and heaves them to the path of least resistance around the shank. These large chunks are difficult to rearrange in such a way as to give a smooth resulting surface. If a chunk is rather large, it will tend to ride up the shank, roll forward and not be in the proper location for the leveler to roll it back to its original location, because the leveler primarily moves the soil laterally, not backward.

SUMMARY OF THE INVENTION

The present invention is directed to a tillage system, which is designed to perform complete tillage of the soil in a single pass while leaving a fairly level surface to reduce the amount of soil preparation required for planting the next season. Specifically, the present system cuts and buries residue, provides shallow tillage with discs, and provides a controlled amount of primary (deeper) tillage without creating a plow sole. As used herein, primary tillage means deep soil plowing, in a range of approximately nine to fourteen inches or greater. Shallow tillage may be in a range of three to six inches approximately. Finally, a leveler smooths the surface behind the chisel shanks.

The overall system functions are achieved through the cooperative action of widely spaced forward disc blades (sometimes referred to as the tillage discs to distinguish them from the trailing leveler discs) followed by chisel plows with winged points. Each plow point is located to the side of a strip of soil left untilled by the forward discs. The tillage discs are arranged in a forward set and a rear set with adjacent discs being offset in the direction of travel. One disc from the forward set and an associated one from the rear set cooperate to till adjacent swaths and move the soil (and residue if any) in opposing lateral directions. The tillage discs are arranged in cooperating pairs. A cooperating pair of tillage discs includes one disc from the forward set and one from the rear set with their working surfaces facing each other (i.e., in laterally "opposing" relation). Adjacent sets of cooperating discs are spaced with one disc from the forward set and one disc from the rear set having their non-working surfaces spaced to leave a strip of untilled soil.

By running the tillage discs at an operating depth in the range of approximately three to six inches, large chunks capable of riding up the plow shank are avoided. Further, some of the tillage discs run nearly in-line ahead of the shanks. That is, the shanks are placed to run adjacent to the edges of the strips of untilled soil left by the tillage discs. The discs provide a notch effect, leaving a furrow fairly closely aligned with the shank. Thus, the disc cutting into the previously untilled soil creates a furrow and the trailing plow, with its point working at a deeper level, is located near the furrow created by a forward tillage disc, at the edge of an untilled strip. This relationship permits the plow more easily to break through the compacted soil with less energy imparted to the soil, reducing a tendency to create large clumps of soil.

The action of the tillage discs is characterized by an aggressive tilling of the soil and top residue. By aggressive action, it is meant that each tillage disc on the forward set is placed at an operating depth, working angle, and lateral spacing from an associated disc such that its leading edge cuts the residue and the disc blade scoops or shovels the soil and residue at a comparatively shallow depth (typically in the range of three to six inches) by turning the soil over, mixing the residue and soil and displacing the mixture laterally in a windrow at least partially covering the swath to be worked by a cooperating disc on the rear set. A cooperating disc from the rear set of tillage discs then tills a swath spaced laterally from the cooperating forward disc, cuts into compacted soil, mixes it with the windrowed soil from the forward cooperating disc and moves the mixture in the opposite lateral direction from its associated forward disc and at least partially behind the forward cooperating disc.

As mentioned, the pairs of cooperating discs are spaced laterally apart to leave a swath of untilled soil. That is, the non-working surfaces of a forward disc in one cooperating pair is spaced laterally from the non-working surface of the nearest disc of the adjacent cooperating pair to leave an untilled strip, which may contain soil and residue worked by the tillage discs.

Located behind the tillage discs in the untilled strips, are chisel plows with winged plow points set at a "deep" or primary operating depth in the range of nine to fourteen inches. They are located to till the untilled swaths left by the tillage discs.

During the past decades, tillage speeds have increased. Speeds above 5½mph, especially, can roll large clods out of the shank path. According to the present invention, the wings on the point are shaped so that the soil has a longer path as it is lifted, and the lift angle is less than 30° relative to the horizontal. The lift on the inner portions of the wings is greater than on the outer portions. That is, the soil path is longer adjacent the central tooth, and provides the twisting and mixing action of the soil. This allows the rear disc leveler effectively and easily to smooth out the surface of the tilled, mixed residue and soil. It is desirable to put some twisting or moldboard-type of roll to the soil in order to mix and bury surface-applied fertilizer and residue deeper into the soil.

The greater lift of the inner portion of the wings and the moderated lift of the outboard portions produces an outboard roll to the soil without lifting and hurling large chunks as far vertically or forwardly. That is, the principal movement of the soil tilled at the primary level is to the side, not forward This helps to prevent the soil from rolling forward and leaves the field with a more even surface in a fore-and-aft direction.

The chisel shanks carrying the plow points are located in the untilled strips of soil between adjacent pairs of cooperating discs. Specifically, the shanks are located toward the lateral edge of an untilled strip left by the tillage discs. This places the point adjacent the location at which a disc has formed a shallow furrow. Thus, the vertical distance between the tip of the point (which performs the primary or deep tillage) and the bottom of the furrow of secondary or shallow tillage is at a minimum—of the order of four to ten inches typically. The churning, lifting action of the plow point is muted by this reduced fracture distance (called the "line of weakness" or "fracture line") because it takes less force or energy to break the soil along a shortened line of weakness so less energy is imparted to the fracturing soil; and the broken soil is less likely to move any substantial distance, either laterally or forward. This cooperative action along the line of weakness leaves a more even surface profile after the chisels pass. The profile between adjacent chisels after they pass is a slight mound, the top of which is approximately centered between adjacent chisels.

A small optional shark fin can be attached to the top of the point. Such fins have been used for many years to help part the soil.

Leveling discs may be placed behind the chisels. The levelers are also arranged in pairs of discs with their non-working surfaces opposing each other. Each pair is centered on the ridge of the berm created by the chisel plows. The leveler discs of adjacent pairs thus part the berm and spread the soil laterally behind the chisel plows to create a smooth or level final surface profile of loosened soil (some of which has been deep-tilled), residue and fertilizer (if fertilizer had been applied before the tillage implement passed). The leveler disc blades as shown in U.S. Pat. No. 5,080,178 are approximately at a 15° angle. When mounted to help smooth the field in the instant invention, it has been found that it is best to run the blades at approximately a 25° angle. That is, the axis of rotation of the disc makes an angle of 25° relative to a line perpendicular to the direction of travel.

DETAILED DESCRIPTION OF THE PREFERRED EMBODIMENT

Figure 1:
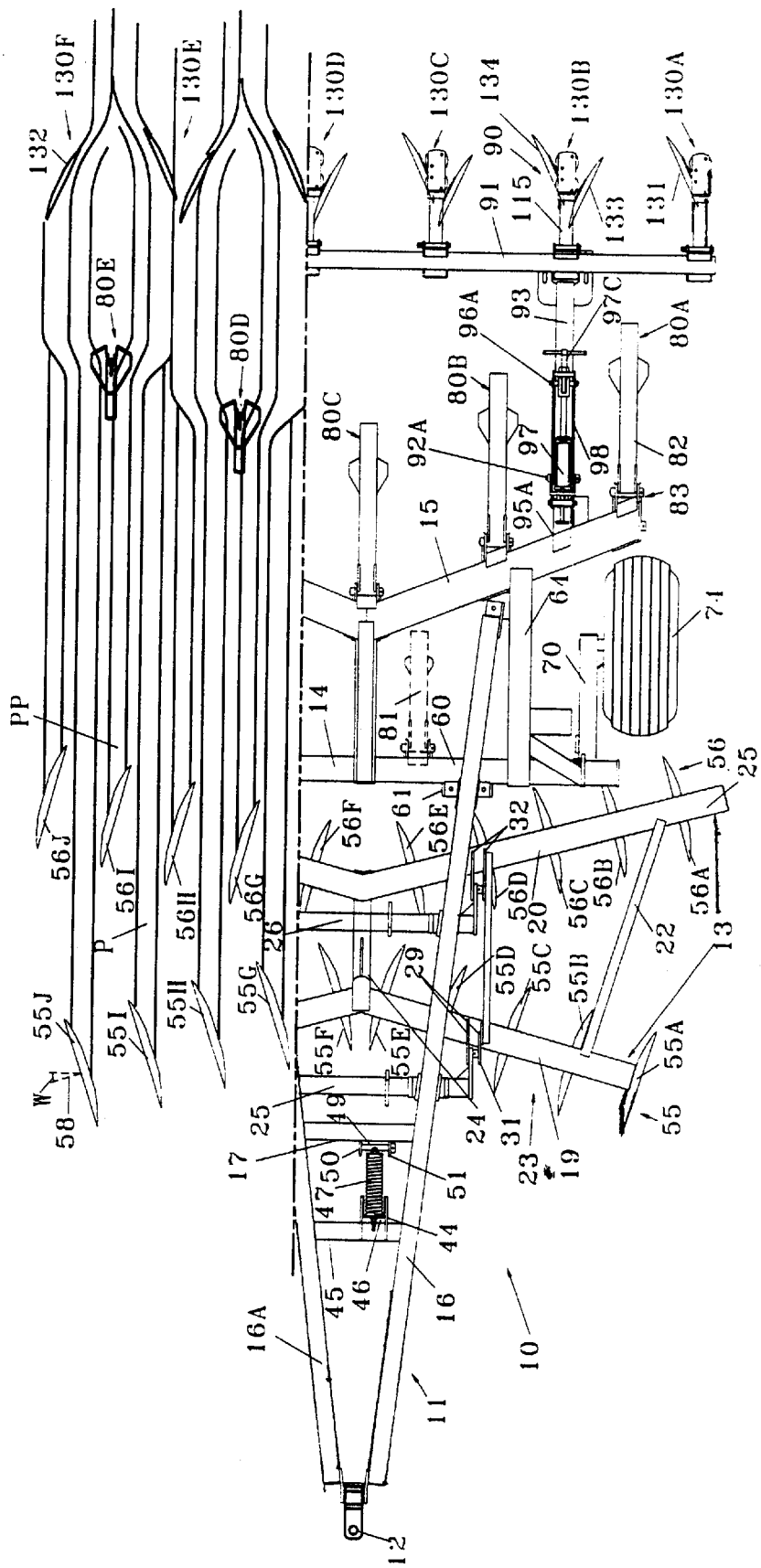
FIG. 1, lower portion, is a plan view of an implement constructed according to the present invention, and in the upper portion, a diagrammatic plan view, illustrating the lateral movement and leveling of soil and residue by the discs in relation to the location and action of the chisel plows.

Referring first to FIG. 1, reference numeral 10 generally designates the overall tillage implement of the present invention. The tillage implement 10 includes a rigid main or pull frame generally designated 11 adapted to be attached at its front to the rear of an agricultural tractor by means of a conventional hitch 12. Midway along and carried by the pull frame 11 is an adjustable disc frame 13. To the rear of disc frame 13 is a transverse support frame 14 which includes a chisel toolbar 15 having a broad chevron-shape with the point headed in the direction of travel and centered on the longitudinal centerline of the implement which extends in the direction of travel.

The pull frame 11 includes first and second elongated side frame members 16, 16A also arranged in a chevron shape and braced toward the front by a cross frame member 17 attached at each end to the pull frame 11. The disc frame 13 includes a forward chevron-shaped mounting bar 19 with the point directed rearwardly and centered on the longitudinal centerline of the implement, and a similar, but wider, rear mounting bar 20 with its point facing the forward direction and centered. Thus, the disc frame 13 in the illustrated embodiment, in its entirety, has a general X-shape. However, a rectangular shape and other configurations could work as well. Forward and rear disc mounting bars 19, 20 are formed into a rigid disc frame by left and right side frame members, the left member being designated 22, rigidly connected (as by welding) at their respective forward ends to the forward disc mounting bar 19 and at their rear ends to the rear disc mounting bar 20. A center longitudinal frame member 24 is rigidly attached between the centers of the forward and rear mounting bars 19, 20 to provide further strength and rigidity to the disc frame 13.

The disc frame 13 is suspended beneath the main pull frame 11 and adapted for vertical adjustment (under operator control) by means of a forward rocker arm 25 and a rear rocker arm 26 which are journaled to the underside of the longitudinal side frame members 16, 16A of the pull frame 11. The left and right sides of the implement are similar. The lower portion of FIG. 1 shows the left side and center of the structure; and the upper portion of FIG. 1 demonstrates the operation of the machine. Thus, only the left side will be described in detail. Persons skilled in the art will appreciate that the right side of the implement is the same as the left side, but in mirror image.

Figure 2:
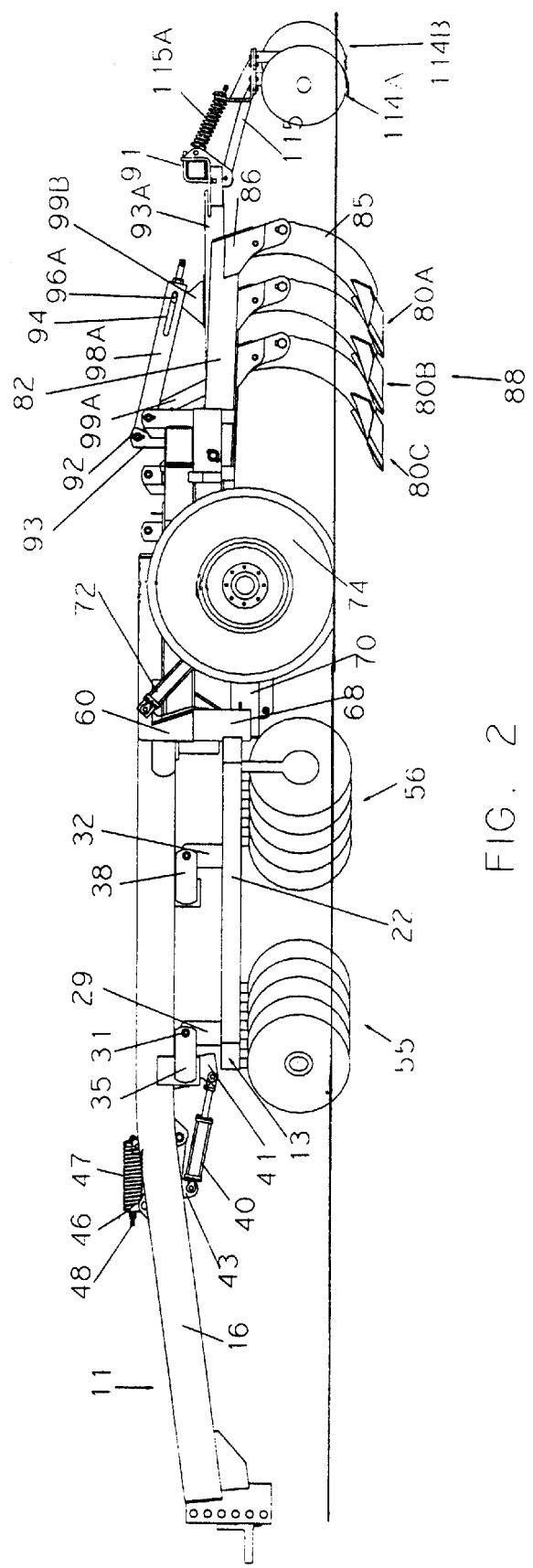
FIG. 2 is a left side view of the apparatus of FIG. 1.

Referring to FIGS. 1 and 2, two pairs of plates (the left pair being shown at 29) are mounted to the top surface of the forward disc mounting bar 19 and spaced to receive a pin, such as the one designated 31 for the plates 29. Similar left and right pairs of mounting plates (the left pair being shown at 32) spaced and provided with pins are affixed to the rear disc mounting bar 20. The forward rocker arm 25 is provided with left and right crank arms (the left one designated 35 in FIG. 2) which have their distal ends journaled on the pins, such as pin 31, mounted to the forward plate pairs 29. Similar crank arms (see the left one designated 38 in FIG. 2) are mounted to the left and right ends of the rear rocker arm 26 and connected at their distal ends to pins mounted to the pairs of mounting plates affixed to the rear disc mounting bar 20.

An hydraulic cylinder unit or actuator 40 (FIG. 2) has its rod end pivotally connected to a crank member 41 fixed to the center of the forward rocker arm 25. The cylinder end of the hydraulic cylinder unit 40 is pivotally mounted to a tab 43 which is part of a rotatable mount 44 (FIG. 1) journaled on a cross member 45 affixed to the side frame members 16, 16A of the pull frame 11. A spring seat 46 is mounted to the top of the rotary mount 44 and seats a coil spring 47 under preload and having a center bolt 48 mounted to a pin 49 (FIG. 1) secured to plates 50, 51 mounted to the cross frame member 17 which, as described, is rigidly fixed to the side frame members 16, 16A.

The operation of the disc frame 13 will now be apparent to those skilled in the art. The operator sets the operating depth of the tillage discs by controlling the hydraulic actuator 40 from the tractor. As the tillage discs (to be described more below) encounter obstruction or unevenness in the ground, the spring 47 acts to cushion the displacement force and restore the disc frame to its operating or use position, similar to what is shown in U.S. Pat. No. 4,546,832. The mounting system for the tillage disc frame maintains the discs operating on substantially the same elevation for all depth settings. The operation depth of the tillage discs may be set independently of the depth of the chisel plows, as will become apparent.

A first or forward set of disc blades generally designated 55 is mounted to the forward disc mounting bar 19 and a second or rear set of similar disc blades 56 is mounted in a similar fashion to the rear disc mounting bar 20 of the disc frame 13. The disc blades are mounted on shanks as is conventional and need not be described further. The individual discs of the forward set are designated 55A–55J, respectively; and the individual blades of the rear set are correspondingly designated 56A–56J, respectively.

Each of the discs 55A–55J and 56A–56J (seen in more detail in FIG. 11) is mounted for rotation about a horizontal axis, such as that designated 58 in FIG. 1 for the disc 55J which defines an angle W(FIG. 1), called the working angle, relative to a line transverse of the direction of travel. The working angle W may also be thought of as the angle between a vertical plane defined by the peripheral edge of a disc and a line parallel to the direction of travel. For the illustrated embodiment, the working angle for the tillage disc is advantageously within the range of approximately 15–22° and preferably about 18°. The spacing of adjacent tillage discs and the relative placement of cooperating front and rear discs will be described below.

In the illustrated embodiment, there are ten forward tillage discs and ten rear tillage discs, thus creating ten pairs of cooperating discs. A "cooperating" or "associated" pair of discs comprises one from the forward set and an adjacent one from the rear set, e.g., 55H and 56H, whose working surfaces face each other. Thus, the disc from the forward set (55H in the example) performs shallow tillage forming a trench or furrow, and throws its soil and residue in one lateral direction (to the right, in the example) to create a windrow. Each cooperating tillage disc (56H in the example) performs its own shallow tillage, forming a trench, and also works at least a portion of the soil in the windrow created by the associated forward disc 55H, moving and mixing both the soil it tilled and the soil/residue forming a portion of the overlying windrow formed by the cooperating tillage disc 55H. Cooperating tillage discs, as described herein, move soil in opposite lateral directions.

Turning now to the transverse support frame 14 (FIGS. 1 and 2) for the plows, an upper transverse tubular frame member 60 is mounted by brackets (the left one shown in FIG. 1 and designated 61) to the side frame members 16, 16A of the pull frame 11, toward the rear (i.e., behind the disc frame 13). Left and right side longitudinal frame members (see the left one 64) are rigidly affixed at their forward ends to the transverse frame member 60 and at their rear ends to the chisel toolbar 15 to form a rigid structure with the pull frame.

Left and right vertical frame members (the left one being shown at 68 in FIG. 2) are rigidly affixed to the left and right sides of transverse frame member 60. Wheel support arms (see the left one 70 in FIG. 3) are pivotally connected to the bottoms of vertical frame members 68, respectively, and extend rearwardly, parallel to the direction of travel. Support wheels 74 have their axles journaled in the rear portions of wheel support arms 70, respectively. First and second hydraulic cylinders 72 are pivotally connected at one end to the vertical frame member 68, respectively, and pivotally connected at the other end, respectively, to the wheel support arms 70. As will be understood, as the hydraulic cylinders 72 are extended under operator control, the entire implement frame (comprising the pull frame 11 and the transverse frame 14) is raised; and conversely, as the hydraulic cylinders 72, 73 are retracted, the implement frame is lowered. This action adjusts the elevation of the tillage discs 55, 56 as well as the chisel plows and leveling discs to be described. The tillage discs 55, 56, however, may be independently adjusted by operation of the hydraulic cylinder 40 as described above.

The structure of the five chisel plow units, designated 80A–80E, respectively, may include conventional sweeps and shanks. However, plows having narrow, rigid shanks and winged points are preferred, and one winged point believed to be of particular advantage is disclosed below. Still referring to FIGS. 1 and 2, each plow unit may be identical, so only unit 80A will be disclosed in further detail. In that unit, a main strut 82 is affixed at its forward end by a conventional mount 83 to the chisel toolbar 15 and extends rearwardly, parallel to direction of travel and generally horizontally. A parabolic shank 85 (FIG. 2) is mounted by a conventional main bolt/shear bolt combination mount 86 to the rear or distal end of the strut 82. A winged point generally designated 88 is mounted to the bottom of the shank 85.

It will be observed that for ten pairs of cooperating tillage discs, 55, 56, there are five chisel plows, leaving one plow for alternate disc pairs and one plow (80C) centered. If it is desired to perform additional primary tillage, smaller, but similar plows may be placed in the remaining untilled strips, such as the lead plow shown in dashed line at 81 in FIG. 1 and mounted to the transverse frame member 60. Following the chisel plows is a disc leveler generally designated 90. The leveler 90 includes a plurality of discs which do not till the soil as do the forward tillage discs 55, 56 performing shallow tillage. That is, the leveler discs are set at a depth such that under normal conditions, their bottom edges do not engaged untilled soil to any continuous and substantial extent. Rather, the leveler discs operate slightly above the original soil level (H in FIG. 3); and they primarily level the soil and residue already tilled and mounded by the tillage discs and chisel plows, leaving the surface of the soil level without the need for substantial additional tillage before planting.

A suitable disc leveler is shown in U.S. Pat. No. 5,180,178, except that that leveler sets the working angle (as defined above) of the leveler discs in a range of 5–15°. The present invention preferably sets the working angle of the leveler discs at approximately 25°. The leveler 90, described further below, is comprised of a mounting bar or toolbar 91 and first and second longitudinal strut frame members 93A connecting the leveler toolbar 91 to the chisel plow toolbar 15.

It will be observed that for the forward set of tillage discs 55, those to the left of the centerline of the machine (the forward/left quadrant when viewing from above), 55A–55E, have their working surfaces facing toward the left of the machine to displace soil and residue in that direction (i.e., outwardly from the center). Similarly, those to the right of the centerline of the machine in the forward set, 55F–55J, face to the right, and also move soil outwardly.

The discs 56A–56J on the rear set having their working surfaces facing toward the center of the apparatus and consequently displace soil inwardly, thereby obviating any build-up of soil or a net displacement of soil outside the swath worked by the apparatus. This permits the apparatus to work the soil in either direction relative to a previously worked swath. The outermost tillage discs on the rear set, 56A, 56J, if they are the same size as the other discs, may be mounted one inch higher and at a slightly lesser working angle, preferably slightly less than 18°, so as to avoid leaving a substantial furrow. Alternatively, raker discs of smaller diameter can be used as the outboard discs on the rear set since the primary function of these outboard discs is to fill the furrow left by the associated or cooperating disc in the forward set.

Thus, for each quadrant of the machine, the tillage discs in a quadrant face the same direction. This avoids a tendency towards clogging or plugging as might otherwise occur with adjacent discs facing each other. The working surfaces of the center discs of the rear set 56E, 56F face each other; but, because their forward cooperating discs 55E, 55F, respectively, move soil outwardly, there is a spacing of additional width in the center of the rear set, thus reducing any tendency toward plugging of the center, rear discs by residue.

The centers of the tillage discs of the forward set 55 are laterally spaced at a distance which is generally greater than half the diameter of the disc. In other words, the lateral distance between corresponding centers of adjacent discs facing the same direction is generally greater than half the diameter of the discs. For example, if twenty-four-inch or twenty-six-inch discs are used, then the discs are set at a space of approximately fifteen to eighteen inches on center. This is not so for the adjacent center blades 55E and 55F obviously, because they throw the cleared top soil in opposite directions.

The discs on the rear set 56 are also spaced in the same manner. The rear discs are located relative to an associated forward disc on the forward set such that the disc on the rear set parts the windrow of mixed soil and residue formed by the associated disc on the forward set. Referring to the right side of the machine in FIG. 1, the disc 55I of the forward set clears a path P and the residue and top soil cleared from path P are displaced to the right onto a windrow. The leading edge of the "cooperating" or "associated" tillage disc 56I on the rear set is located to part the windrow and to clear a second strip of ground PP.

As will be observed, for each pair of associated or cooperating discs, one in the front and one in the rear, the forward disc clears a swath of soil and moves the cleared soil and residue in one lateral direction to form a windrow. The cooperating rear disc cuts a swath of previously unworked soil, and, in addition, moves at least a portion of the windrow created by the forward cooperating disc. The rear cooperating disc moves its soil in the opposite lateral direction to fill the furrow formed by the cooperating forward disc. This is the case for all ten pairs of cooperating discs in the illustrated embodiment. The center discs on the forward set of discs throw their soil outwardly. The cooperating center discs on the rear set are spaced laterally further apart than are the center discs on the forward set, and the center discs on the rear set, 56B, 56F, throw their soil toward the center.

Figure 3:
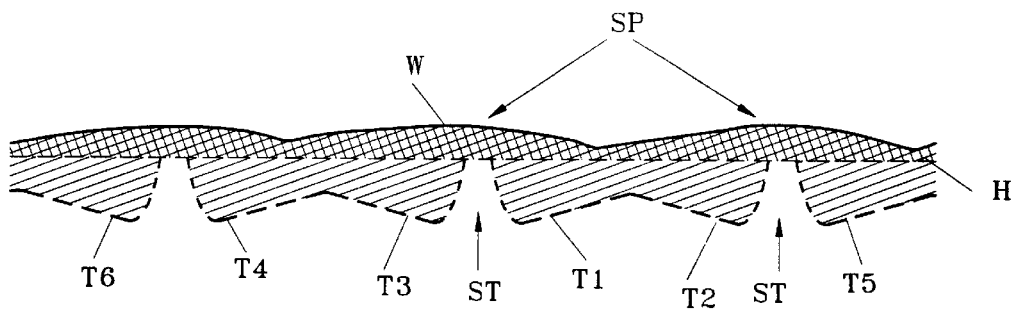
FIG. 3 is a vertical view looking forward of an idealized soil profile illustrating the operation of the first and second rows of tillage discs.

The operation of the tillage discs is illustrated in idealized form in FIG. 3. The original soil level is represented by the horizontal line H. The trench formed by tillage disc 55I is designated T1 and the trench formed by the rear cooperating disc 56I is designated T2.

The idealized surface profile left after the tillage discs have passed is identified by the line SP. It will be observed from FIG. 3 that the soil/residue worked by disc 56I (which disc is offset to the right of disc 55I and behind it) fills the trench T1 formed by the cooperating forward disc 55I and mounds over that trench T1 and even onto the trench formed by the adjacent, forward disc of the rear set, 56H, which had formed trench T3. This is represented by the windrow or mound W in FIG. 3. It is a characteristic and important feature of the present invention that the operation of the tillage discs will form low, even profile mounds of tillage soil and residue over a wide range of comparatively high ground speeds (i.e., 5–8 mph). This is due in major part to the aggressive setting of the working angle of the tillage discs, and the construction, arrangement and placement of the tillage discs. There is thus left by the tillage discs, a series of mounds (or windrows) of mixed soil, residue and fertilizer extending to the depth of secondary tillage and spread out fairly evenly with comparatively low ridges.

Still referring to FIG. 3, it will be observed that the trenches (for example, T1 and T2) formed by one pair of cooperating tillage discs (55I, 56I) are spaced slightly from the trenches formed by an adjacent pair of cooperating discs to form strips of untilled soil designated ST. For example, the trench T5 shown in FIG. 3 formed by the forward tillage disc 55J is spaced from the trench T2 formed by rear tillage disc 56I of the rear set of discs. There is thus formed, between each set of overlapping furrows formed by cooperating tillage discs, a narrow strip of previously untilled soil, illustrated in FIG. 3 by the regions designated ST. The chisel plows 80A–80E are set to work in alternate ones of the strips ST, but the plows are effective to complete tillage of the soil. In the example being discussed, chisel plow 80E is set to work in the strip ST between trenches T5 (formed by tillage disc 55J) and trench T2 (formed by tillage disc 56I on the rear set of tillage discs). This is illustrated in FIG. 4 where it can also be seen that chisel plow 80D is set to work in the narrow strip St between trenches T4 and T6.

Figure 4:
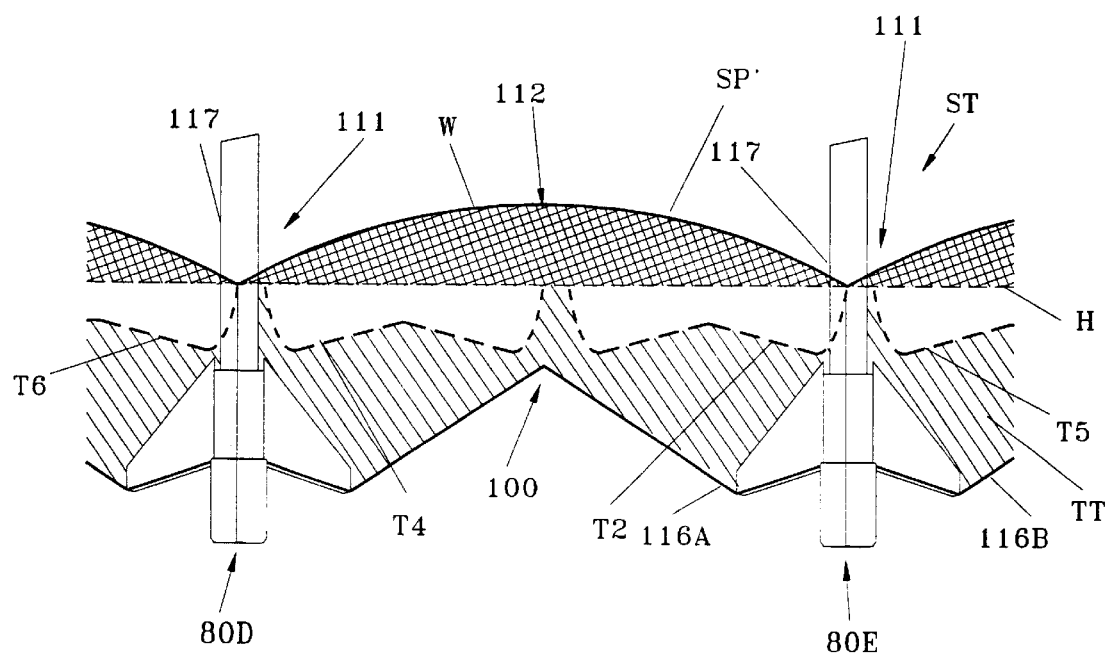
FIG. 4 is a vertical view of a soil profile illustrating the operation of the chisel plows.

Still referring to FIG. 4, the depths and operation of the chisel plows is such as to perform deep tillage at the level set by the points of the chisel plows, and also to till soil in a broad, chevron-shaped trench indicated at TT in FIG. 4. The extent of the trenches tilled by the chisel plows is such as to till substantially all of the soil beneath the trenches formed by the forward tillage discs, including that soil beneath the strips of untilled soil ST between adjacent chisel plows, as indicated in the region generally designated 100 in FIG. 4. The region of tillage accomplished by the chisel plows is shown in FIG. 4 with angled sectioning, such as in trench TT, as explained. Moreover, the loosened soil existing on the surface and filling the trenches formed by the tillage discs (as explained in connection with FIG. 3) is also re-worked by the chisel plows and diagrammatically illustrated by the cross-hatched portion beneath the soil profile SP' in FIG. 4. For clarity of illustration, the trenches (e.g., T2, T4) formed by the tillage discs are not hatched or marked. Rather, they are unmarked. However, they are filled with loosened, tilled soil, primarily soil worked by the tillage discs and mixed with residue and, if available, fertilizer. It will be observed, however, by comparing FIGS. 3 and 4, that the mounds or windrows left by the chisel plows are characterized as having a slightly higher ridge than those formed by the tillage discs alone, and the spacing of swales between the surface mounds is defined by the spacing of the chisel plows, which is twice the lateral spacing of pairs of cooperating tillage discs.

Figure 5:
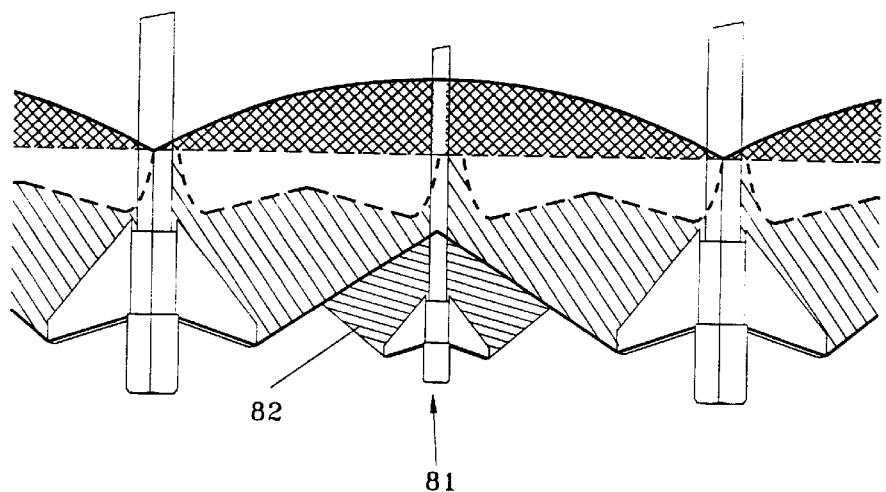
FIG. 5 is a similar view of a soil profile similar to FIG. 4, but with the system including a smaller lead shank.

As discussed above, although some secondary tillage is formed in the region 100 located approximately midway between adjacent chisel plows, if it is desired to perform additional tillage in that region, lead chisel plows, such as the one designated 81A in FIG. 5 may be mounted to the transverse frame member 60 of the transverse frame 14 (see lead plow 81 in FIG. 1) and located approximately midway between adjacent ones of the main chisel plows mounted to the chisel plow toolbar 15. If used, the lead chisel plows 81 (shown in phantom in FIG. 1 between main chisel plows 80B and 80C) may be similar to the primary chisel plows already described, except they are set to operate at a lesser operating depth and may be scaled down in size to perform less tillage, represented by the trench shown at 82 in FIG. 5.

It will be observed from FIGS. 1, 3 and 5, and it is deemed to be an important feature of the invention for the reasons to be discussed below, that the main chisel plows 80A–80B are located to the left side of their associated untilled strip, such as that designated ST in FIG. 4. The chisel plows till the soil deeply and because they are provided with winged points, they fracture the soil not only directly above the points, but laterally to the side in a generally chevron-shaped trough defined by the idealized soil profile lines 116A, 116B for the chisel plow 80D in FIG. 4. The chisel plows are offset relative to the strip of untilled soil reaching to the surface and located between adjacent pairs of cooperating discs, to enhance the primary tillage effectiveness and to reduce the force required for complete tillage, and thereby conserve fuel, and to mute the tendency to create large clumps of soil in the process of primary tillage. This is so because the fracture line or line of weakness from the tip of a winged point is adjacent to the wall of the furrow or notch 117 cut by the rear disc 56I on the right side of a cooperating disc pair (see FIG. 1). This is a region of soil weakness which is more easily fractured and more likely to be broken by the action of the chisel plow than would otherwise occur if the chisel plow were centered on the untilled strip between adjacent pairs of cooperating discs. Thus, as seen in FIG. 4, the tilled, loosened soil and residue formed by the action of the tillage discs and the chisel plows is illustrated by the cross-hatched mound designated SP', having troughs at 111 which are the locations in which the plows are set, and a peak at 112 which is the location between adjacent sets of cooperating tillage disc pairs for which no chisel plow is provided. The leveler discs, described more below, are then set to straddle the crest 112 of the mound W of soil left by the chisel plows.

Figure 7:
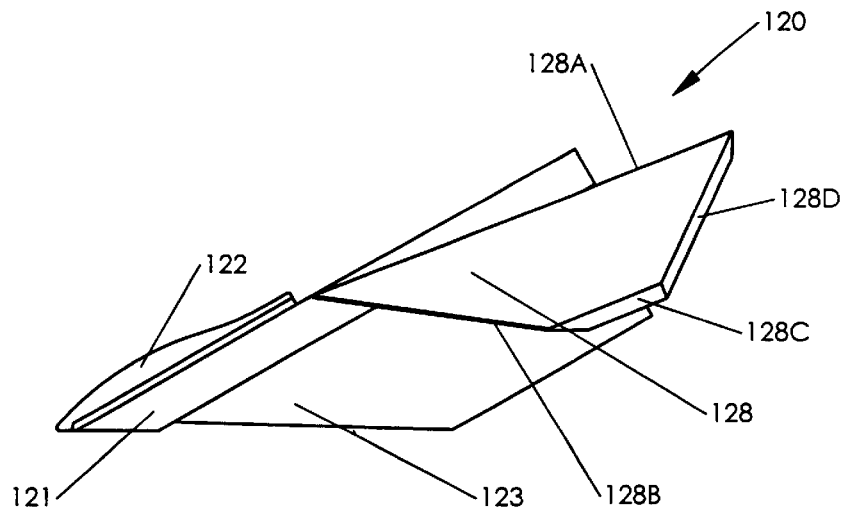
FIG. 7 is a left side view of an improved tillage point used in the implement of FIG. 1.
Figure 8:
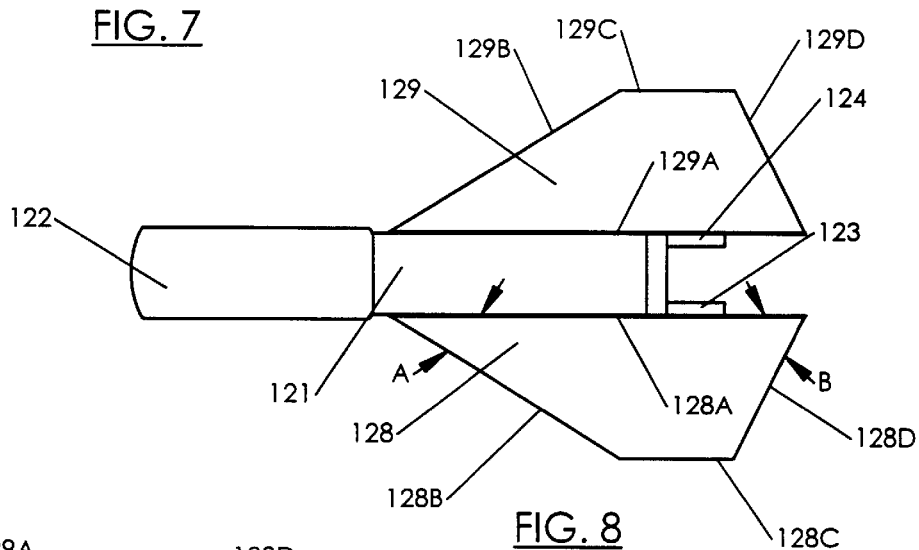
FIG. 8 is a plan view of the tillage point of FIG. 7.
Figure 9:
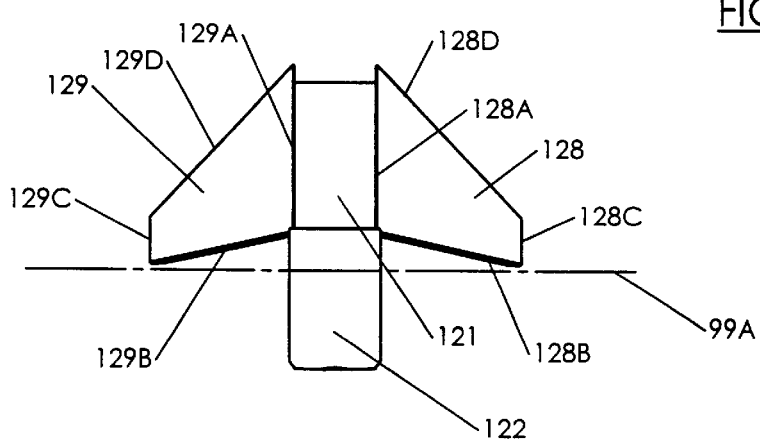
FIG. 9 is a front view of the tillage point of FIG. 7.

Turning now to FIGS. 7–9, the groundbreaking and working tool or winged point, generally designated by reference numeral 120, is seen to comprise a narrow, flat member 121 (sometimes called a "tooth") which may be formed from hardened bar stock, and having a curved cast upper surface or tip 122 welded to the top as a wear surface. First and second mounting plates 123, 124 are welded to the bottom of the tooth 121. The structure may be strengthened by a brace near the forward portion of the point, under the leading portion of the shank, if desired or necessary.

A pair of wings 128, 129 are welded to the sides of the tooth 121, and they may be suitably braced against the tooth and the mounting plates. Each of the wings 128, 129 in the illustrated embodiment is a piece of flat steel in the general shape of a trapezoid. Thus, the left wing 128 has an inner straight edge 128A (FIG. 8) welded to the tooth 121 of the point, a sharpened leading edge 128B, a side edge 128C, which is parallel to the inner edge 128A, and a rear edge 128D. The right wing 129 has corresponding edges designated 129A–D, respectively.

As seen in FIG. 7, the winged point 120 is seen in its normal or field use position with the upper surface of the tooth 121 sloping upwardly and rearwardly from its lowest, forward tip at approximately 30° relative to the horizontal. The wings 128, 129 of the illustrated embodiment extend outwardly and upwardly at an angle of approximately 23°, i.e., less than the 30° slope of the tooth 121; and the wings are tilted slightly downwardly proceeding outwardly from the tooth 121.

As seen in FIG. 9, the leading edges 128B, 129B of the wings therefore extend outwardly and slightly downwardly in the illustrated embodiment, but this is not critical to the practice of the invention and would not appear if the side tilt of the wings were less. The leading edges of the wings are at a substantial distance above the lowermost point of the point 121 and the tip 122 of the point, see FIG. 7.

Referring to FIG. 8, when viewed in elevation, the leading edge 128B of the wing 128 extends rearwardly relative to the straight inner edge 128A to define an angle of approximately 45°. The rear edge 128D of the wing extends forwardly relative to the inner edge 128A to form an included angle of approximately 70°. It will thus be observed that the length of the inner edge 128A, between the forward edge 128B and the rear edge 128D is substantially greater than the corresponding length of the side of the outboard side edge 128C. The length of the inboard edge of the wings in the illustrated embodiment is almost four times the length of the outboard edge, and it is preferably greater than twice the length of the outboard edge, but the length of the inboard edge may be one and one-half times the length of the outboard edge and still achieve the desired effect. The reason for this, and the resulting advantage, is that the soil traveling up and over the wing adjacent the tooth 121 has a much longer distance to travel, and because of the fore-to-aft slope of the wing, the soil moving over the inner portion of a wing is elevated more than is soil traveling over an outboard edge of the wing. The right wing 129 is a mirror image of the left wing just described and works the same way. This can seen from FIGS. 7 and 9, the latter being a frontal view of the point. As seen in FIG. 9, the vertical projection of the outboard edge 128C on a vertical plane is substantially less than the projection of the inboard edge 128A. Thus, the soil traveling along a wing adjacent the inboard edge is lifted, and therefore broken and turned, to much greater extent than the soil traveling along the outboard edge 128C, all other factors, including the soil consistency, being the same. This structure has the effect of rolling the soil over and to the side, as opposed to bull-dozing soil forward, which displaces soil which cannot be later moved laterally to achieve a level surface.

Figure 10:
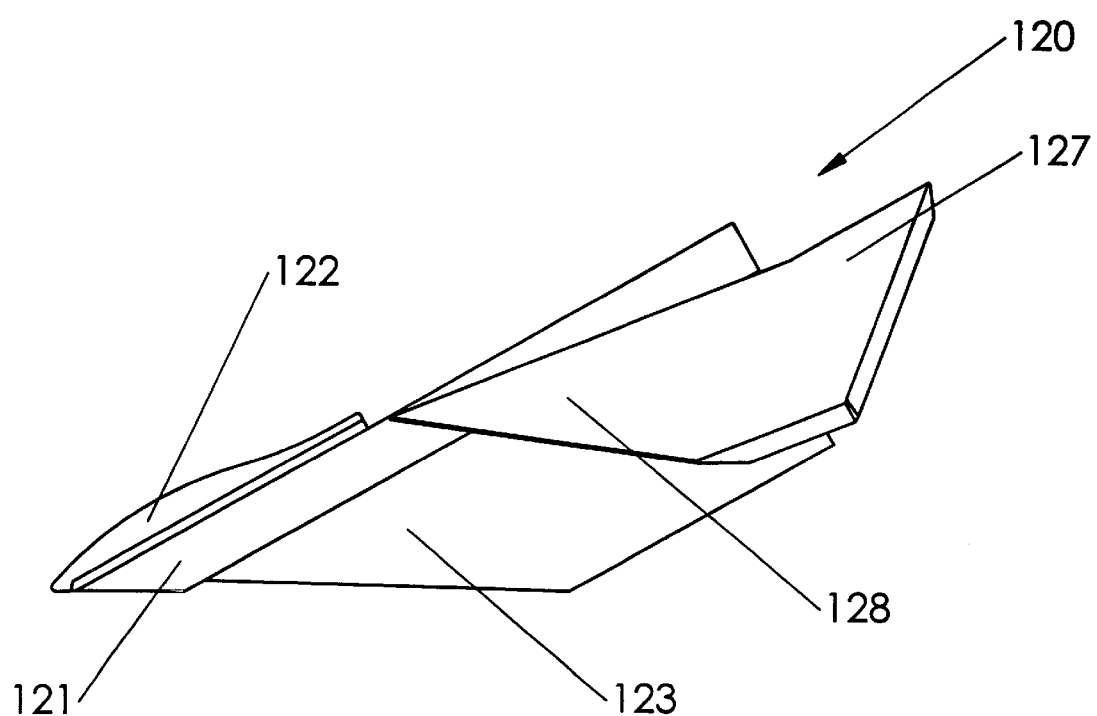
FIG. 10 is a left side view of an alternate embodiment of the tillage point.

Turning now to FIG. 10, there is shown a side view of a point which is similar to that shown in FIG. 9, but which has been modified in that the upper, inner portion of the wings (see the portion 127 for the left wing 128) has been bent or formed upwardly to provide, in addition to the greater length of travel provided by the inboard portion of the wing, an extra lift. This contributes to and promotes the elevation and outward, lateral rolling of the soil, away from the point and the shank and to the side while reducing any tendency to heave soil clumps forward.

Figure 6:
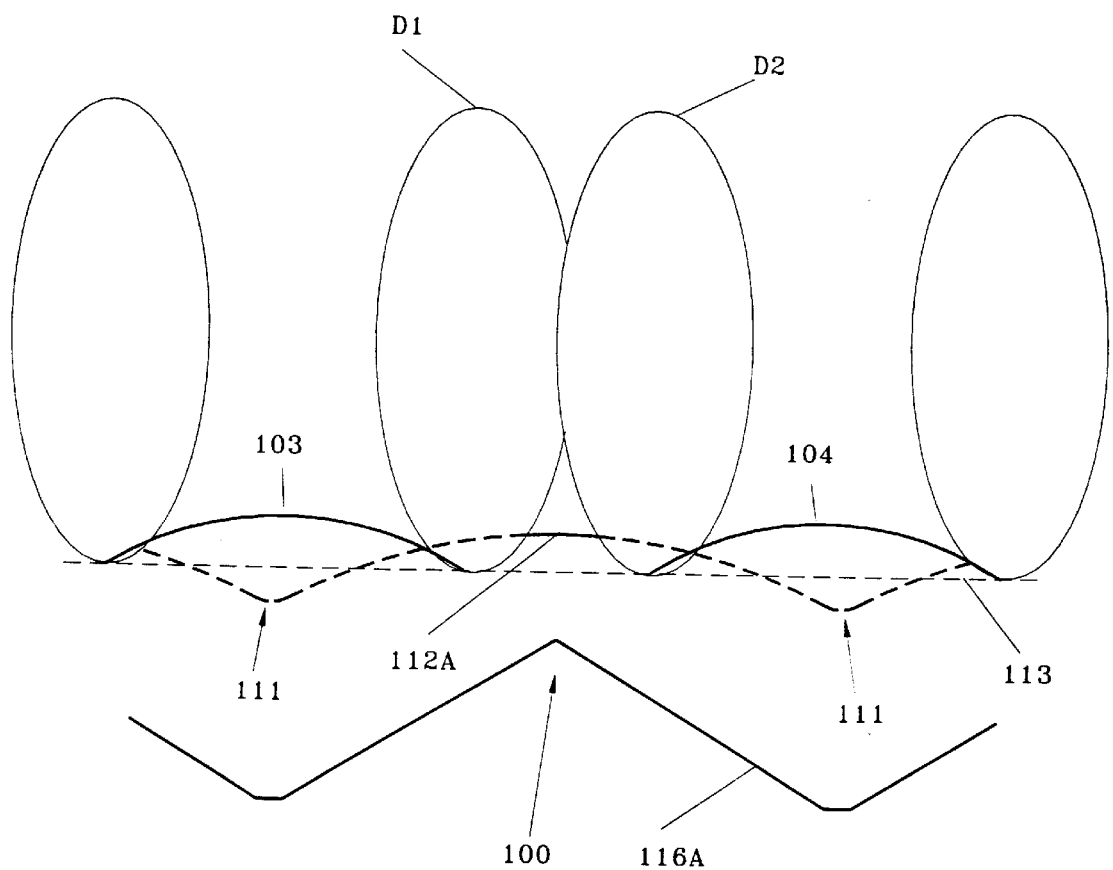
FIG. 6 is a similar view of a soil profile illustrating the operation of the leveling discs on the soil profile left by the chisel plows.

Referring now to the leveler 90 (FIGS. 1 and 2), attached along the length of the leveler toolbar 91 in a spaced manner are the six leveler disc assemblies 130A–130F. The two outer disc leveler assemblies 130A, 130F each include only a single respective disc 131, 132 for moving soil inward toward the center of the chisel plow in reducing ridges formed by the outboard chisel plows. The remainder of the disc leveler assemblies 130B–130E each have two discs, one facing toward the left and the other facing toward the right with the non-working surfaces of the discs adjacent each other. Thus, the pair of discs for the disc leveler assembly 130B are designated 133, 134. The two discs 133, 134 of the disc leveler assembly 130B are spaced slightly apart to move the sides of the windrow formed by the chisel plows laterally, behind the chisel plows, forming the smaller windrows 103, 104 (FIG. 6), while the center portion 112A between the discs breaks down under weathering because it is loose soil. The leveler discs, as indicated in FIG. 6 at D1, D2, are spaced slightly to either side of the crest or peak 112A of the mounds SP' formed by the chisel plows 80A–80E and move soil outwardly toward the swales 111. Since the soil which is worked by the leveler discs is loosened soil, the smaller narrow band or peak 112A in FIG. 6 and shown in solid line left by adjacent leveler discs D1, D2, working in opposite directions is quickly broken down by the weather, and the troughs 111 left by the chisel plows are filled with loosened soil, indicated by solid line mounds 103, 104 in FIG. 6. The leveler discs are set to operate at an elevation (dashed horizontal line 113 in FIG. 6) slightly above the original soil level H, by an inch or two.

Staggering the discs, fore and aft, of each pair of leveler discs has the advantage of avoiding compacting the narrow band or ridge of soil left by the gap between the discs. This staggered arrangement also has the advantage of reducing any tendency of residue or soil clumps to plug between the convex, non-working surfaces of a disc pair. Moreover, it will be observed that the concave working surfaces of adjacent leveler discs (such as the end disc of assembly 130A and the left side disc of disc assembly 130B) are also offset or staggered along the direction of travel. This further facilitates the passage and handling of residue. If the working surfaces of adjacent discs were in lateral alignment, each would be heaping residue on the other, and this would decrease the ability of the implement to handle residue.

The disc leveler may be adjusted in height relative to the transverse support frame 14. It will be recalled that the chisel toolbar 15 is rigidly attached to the transverse frame 14 and is raised and lowered with the transverse support frame 14 as it is elevated relative to the support wheels 74. As also described above, the leveler toolbar 91 is attached to the chisel toolbar 15 by means of left and right longitudinal struts, the left one being shown at 93 in FIG. 1. Height adjustment of the leveler toolbar is accomplished by left and right hydraulic adjusting mechanisms which are similar. The left hydraulic adjusting mechanism is shown in FIGS. 1 and 2 and it will be appreciated that the right hydraulic adjusting mechanism, not shown in the drawing, is similar and operates in unison with the left hydraulic adjusting mechanism. Turning then to the left hydraulic adjusting mechanism, the forward end of the strut 93 is pivotally mounted beneath the chisel toolbar 15 at 95. The cylinder end of an hydraulic cylinder unit 97 is pivotally to the forward end of a housing 98 which is pivotally mounted at 92 to an extension member 99 fixed to the top of the chisel toolbar 15 (FIG. 2). The housing 98 is provided with left and right aligned slots (the left slot being shown at 94 in FIG. 2) which receive a cross pin 99A mounted to a bracket 99B fixed to the top of the strut 93.

The cylinder end of the hydraulic cylinder unit 97A is mounted within the housing 98A, and the rod end is provided with a clevis receiving a cross pin 99A received in the slots 94 and mounted to bracket 97.

An adjusting screw 97C is received in a bolt fixed to the bottom of the housing 98. When the adjusting screw 97C is turned by hand, it adjusts the limit position of the extension of the hydraulic cylinder unit, because the screw 97C engages the cross pin 96A and limits the extension of the cylinder unit. As the adjusting screw 97A is turned so that it extends further into the housing 98, the extension limit of the hydraulic cylinder unit is shortened, and the leveler toolbar 91 will thus be set at a higher position when the hydraulic actuator 97A is extended. When the adjusting screw 97C is turned in the other direction so that it is withdrawn from the housing 98, the hydraulic cylinder will be able to extend further, thereby permitting the leveler toolbar 91 to be lowered, causing the leveler discs to operate at a lower elevation.

Figure 11:
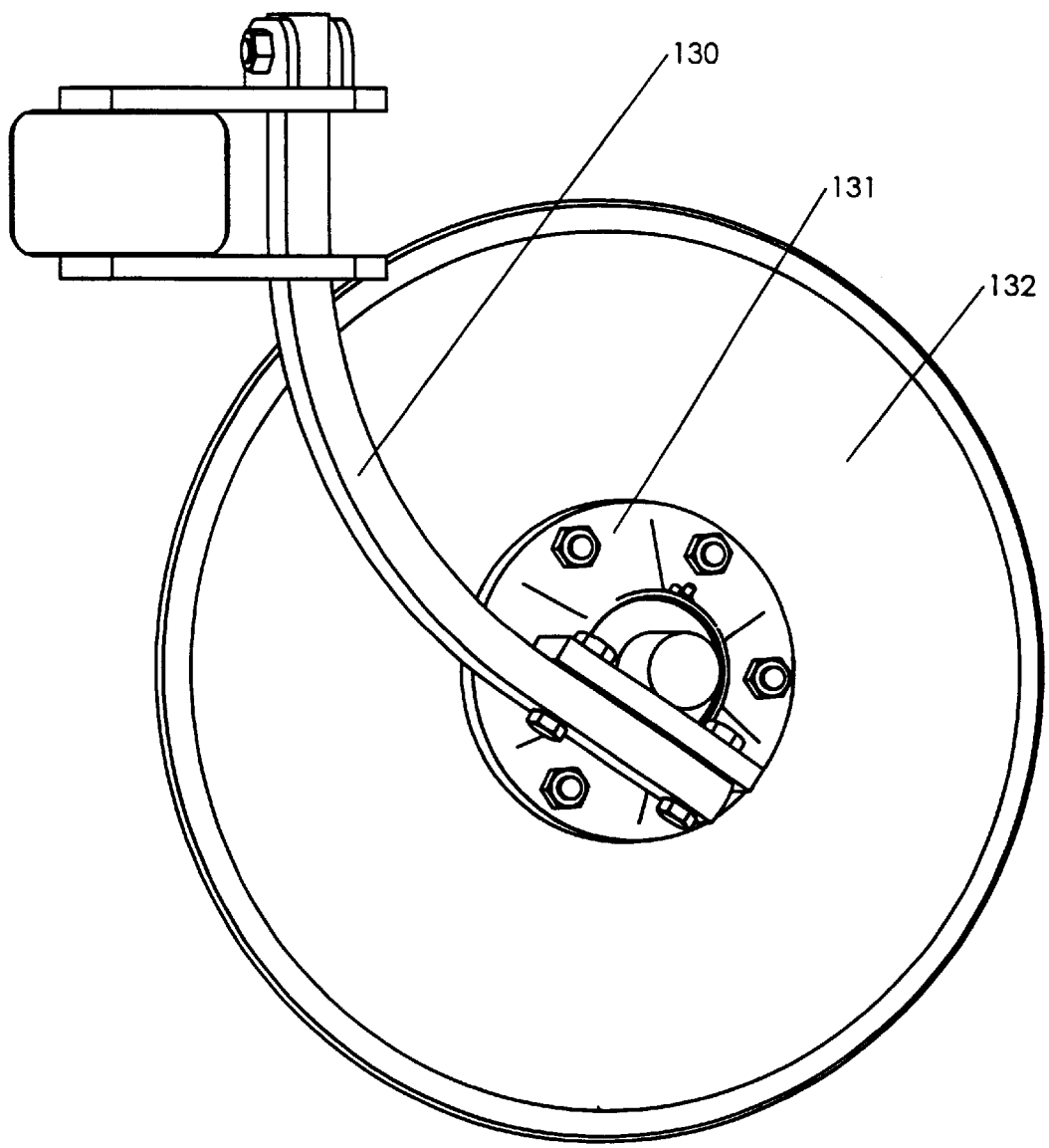
FIG. 11 is a left side view of a tillage disc and mount used in the present invention.

As shown in FIG. 11, an alternate tillage disc mount may be used in rocky soil conditions. A curved spring steel shank 130 carrying a hub 131 to which a tillage disc 132 is mounted may be used in this situation to mount the discs. The outermost tillage discs in the second line, 56A, 56J may be spaced laterally inwardly at a slightly narrower spacing than normal since they are normally angled less.

While particular embodiments of the present invention have been shown and described, it will be obvious to those skilled in the art that changes and modifications may be made without departing from the invention in its broader aspects. For example, with the chisel points located as disclosed above, having the point located in untilled soil but adjacent a line extending rearward from the leading edge of forward discs, many of the benefits of the invention may be obtained even if the other discs (i.e., the discs facing in the opposing direction) are located to the rear of the points. The reduction of the length of the fracture line is still obtained. Further, one embodiment of an improved winged tooth has been disclosed, but many of the performance benefits can be obtained for most soils if the tooth is inclined upwardly and rearwardly from its leading edge at less than about 33° and the wings are inclined so that the lift surface defines an angle less than about 26° with the inner edge of each wing being at least about one and one-half times as long as the outer edge of the wing. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. In a chisel plow for performing deep tillage, having an upright shank adapted to be mounted to a tillage implement, an improved tillage point comprising:

a tooth member mounted to said shank and extending downwardly and forwardly therefrom in a use position;

first and second wing, one mounted to either side of said tooth, each wing extending upwardly and rearwardly in a field use position and having an elongated inner edge adjacent said tooth member, an outer edge generally parallel to said inner edge and substantially shorter than said inner edge, a forward edge extending rearward from said tooth member and located above the working level of the forwardmost location of said tooth member in said field use position, and a rear edge extending forwardly of said tooth member, said wings characterized in that the inner edges of said wings provide a substantially greater rise to lift soil than does the outer edge thereof, thereby imparting a lifting and laterally rolling motion to tilled soil;

wherein each of said wings extends rearwardly and upwardly from said forward edge at a lift angle of about twenty-four degrees or less relative to the horizontal in a field use position;

wherein said tooth is an elongated, narrow flat member and each of said wings of said points is generally planar and has an elongated inner edge generally parallel to and substantially shorter than outer edge, whereby each wing lifts soil a greater extent above the inner edge thereof, thereby imparting a lateral rolling motion to soil being worked on either side of said tooth member;

wherein each of said wings is formed of flat steel plate and is in the general form of a trapezoid defining a leading edge spaced above the lowermost extent of said tooth member and extending outwardly and rearwardly from said tooth member in said field use position;

wherein said leading edge of each of said wings extends rearwardly relative to the inner edge thereof at approximately forty-five degrees;

wherein each of said wings further includes a rear edge extending forwardly at approximately thirty degrees relative to said inner edge thereof; and wherein said inner edge of each wing is at least approximately twice as long as the outer edge thereof.

2. The apparatus of claim 1 characterized in that said inner edge of each wing is approximately four times as long as the outer edge thereof.

3. The apparatus of claim 1 wherein each of said wings is in the general form of a trapezoid and made of steel plate stock, the inner edge of each wing being at least twice the length of the outer edge thereof and the upper, inner portion being turned upwardly to impart greater lift to soil moving up the inner portion thereof.

4. In a chisel plow for performing deep tillage, having an upright shank adapted to be mounted to a tillage implement, an improved tillage point comprising:

a tooth member mounted to said shank and extending downwardly and forwardly therefrom in a use position;

first and second wing, one mounted to either side of said tooth, each wing extending upwardly and rearwardly in a field use position and having an elongated inner edge adjacent said tooth member, an outer edge generally parallel to said inner edge and substantially shorter than said inner edge, a forward edge extending rearward from said tooth member and located above the working level of the forwardmost location of said tooth member in said field use position, and a rear edge extending forwardly of said tooth member, said wings characterized in that the inner edges of said wings provide a substantially greater rise to lift soil than does the outer edge thereof, thereby imparting a lifting and laterally rolling motion to tilled soil;

wherein each of said wings further includes a rear edge extending forwardly at approximately thirty degrees relative to said inner edge thereof; and wherein said inner edge of each wing is at least approximately twice as long as the outer edge thereof.

5. In a chisel plow for performing deep tillage, having an upright shank adapted to be mounted to a tillage implement, an improved tillage point comprising:

a tooth member mounted to said shank and extending downwardly and forwardly therefrom in a use position;

first and second wing, one mounted to either side of said tooth, each wing extending upwardly and rearwardly in a field use position and having an elongated inner edge adjacent said tooth member, an outer edge generally parallel to said inner edge and substantially shorter than said inner edge, a forward edge extending rearward from said tooth member and located above the working level of the forwardmost location of said tooth member in said field use position, and a rear edge extending forwardly of said tooth member, said wings characterized in that the inner edges of said wings provide a substantially greater rise to lift soil than does the outer edge thereof, thereby imparting a lifting and laterally rolling motion to tilled soil;

wherein each of said wings further includes a rear edge extending forwardly at approximately thirty degrees relative to said inner edge thereof; and wherein said inner edge of each wing is at least approximately four times as long as the outer edge thereof.

* * * * *